United States Patent
Sen et al.

(10) Patent No.: US 7,788,391 B2
(45) Date of Patent: Aug. 31, 2010

(54) USING A THRESHOLD VALUE TO CONTROL MID-INTERRUPT POLLING

(75) Inventors: Sujoy Sen, Portland, OR (US); Anil Vasudevan, Portland, OR (US); Linden Cornett, Portland, OR (US); Prafulla Deuskar, Hillboro, OR (US)

(73) Assignee: Intel Corporation, Santa Clara, CA (US)

( * ) Notice: Subject to any disclaimer, the term of this patent is extended or adjusted under 35 U.S.C. 154(b) by 1164 days.

(21) Appl. No.: 10/973,790

(22) Filed: Oct. 25, 2004

(65) Prior Publication Data

US 2005/0223133 A1     Oct. 6, 2005

Related U.S. Application Data

(63) Continuation-in-part of application No. 10/815,895, filed on Mar. 31, 2004.

(51) Int. Cl.
    G06F 15/16    (2006.01)
(52) U.S. Cl. .......................... 709/230; 370/351
(58) Field of Classification Search ............ 710/5, 710/62, 109, 305; 370/230, 471, 392, 351; 714/776
    See application file for complete search history.

(56) References Cited

U.S. PATENT DOCUMENTS

| | | | |
|---|---|---|---|
| 5,090,011 A * | 2/1992 | Fukuta et al. ............ | 370/230 |
| 6,314,100 B1 | 11/2001 | Roach et al. | |
| 6,389,468 B1 | 5/2002 | Muller et al. | |
| 6,438,604 B1 | 8/2002 | Kuver et al. | |
| 6,675,200 B1 | 1/2004 | Sapuntzakis et al. | |
| 6,751,709 B2 | 6/2004 | Seidl et al. | |
| 6,907,042 B1 | 6/2005 | Oguchi | |
| 6,986,046 B1 | 1/2006 | Tuvell et al. | |

(Continued)

FOREIGN PATENT DOCUMENTS

EP       0574140 A1      12/1993

(Continued)

OTHER PUBLICATIONS

Makineni, S. et al, "Performance Characterization of TCP/IP Packet Processing in Commercial Server Workloads", IEEE—Conference Proceedings Article, 2003, pp. 33-41, XP010670787.

(Continued)

*Primary Examiner*—Ario Etienne
*Assistant Examiner*—Marshall McLeod
(74) *Attorney, Agent, or Firm*—Grossman, Tucker, Perreault & Pfleger, PLLC (57) ABSTRACT

In one embodiment, a method is provided. The method of this embodiment provides performing packet processing on a packet, and placing the packet in a placement queue; if no read buffer is available, determining if the size of the placement queue exceeds a threshold polling value; and if the size of the placement queue exceeds the threshold polling value: if there are one or more pending DMM (data movement module) requests, polling a DMM to determine if the DMM has completed the one or more pending DMM requests for data associated with an application; and if the DMM has completed the one or more pending DMM requests, then sending a completion notification to the application to receive the data.

22 Claims, 7 Drawing Sheets

U.S. PATENT DOCUMENTS

| | | | |
|---|---|---|---|
| 7,012,918 | B2 | 3/2006 | Williams |
| 7,089,344 | B1 | 8/2006 | Rader et al. |
| 7,181,531 | B2 | 2/2007 | Pinkerton et al. |
| 7,668,165 | B2 | 2/2010 | Hoskote et al. |
| 2003/0014544 | A1 | 1/2003 | Pettey |
| 2003/0169738 | A1* | 9/2003 | McDaniel .................. 370/392 |
| 2003/0217231 | A1 | 11/2003 | Seidl et al. |
| 2004/0013117 | A1 | 1/2004 | Behrens et al. |
| 2004/0030806 | A1 | 2/2004 | Pandya et al. |
| 2004/0054837 | A1* | 3/2004 | Biran et al. ................. 710/305 |
| 2004/0225748 | A1 | 11/2004 | Chong |
| 2005/0223128 | A1 | 10/2005 | Vasudevan et al. |
| 2005/0223134 | A1 | 10/2005 | Vasudevan |
| 2006/0075142 | A1 | 4/2006 | Cornett |
| 2008/0126553 | A1 | 5/2008 | Boucher et al. |

FOREIGN PATENT DOCUMENTS

| | | |
|---|---|---|
| EP | 0642246 A2 | 3/1995 |
| EP | 0657824 A1 | 6/1995 |
| JP | 06078001 A | 3/1994 |
| JP | 06125365 A | 5/1994 |
| JP | 07078112 A | 3/1995 |
| JP | 07221780 A | 8/1995 |
| JP | 2000332817 A | 11/2000 |
| JP | 2002524005 T2 | 7/2002 |
| JP | 2005539305 T2 | 12/2005 |
| JP | 2006516054 T2 | 6/2006 |
| WO | 2005104486 | 11/2005 |

OTHER PUBLICATIONS

Written Opinion of the International Searching Authority, mailed Oct. 12, 2006.
Office Action Received for EP Patent Application No. 04756431.5, mailed on Oct. 1, 2007, pp. 3.
Office Action Received for SG Patent Application No. 200606011-5, mailed on Oct. 30, 2007, pp. 11.
Office Action Received for SG Patent Application No. 200606011-5, mailed on Feb. 2, 2007, pp. 10.
English Translation of Office Action Received for KR Patent Application No. 2006-7020469, mailed on Mar. 28, 2007, 3 pages.
English Translation of Notice of Allowance Received for KR Patent Application No. 2006-7020469, mailed on Nov. 28, 2007, 10 pages.
Notice of Allowance Received for TW Patent Application No. 93119637, mailed on Dec. 20, 2006, pp. 3.
Office Action Received for U.S. Appl. No. 11/027,719, mailed on Jun. 13, 2008, pp. 15.
International Preliminary Report on Patentability for PCT Patent Application No. PCT/US2004/021015, mailed on Oct. 12, 2006, pp. 8.
International Search Report / Written Opinion for PCT Patent Application No. PCT/US2004/021015, mailed on Dec. 23, 2004, pp. 12.
Office Action received for U.S. Appl. No. 10/815,895 mailed on Jan. 8, 2008, pp. 19.
Action received for U.S. Appl. No. 10/815,895 mailed on Jul. 18, 2008, pp. 22.
Notice of Allowance received for SG Application No. 200606011-5 mailed on Jun. 25, 2008, pp. 8.
Non Final Office Action received for U.S. Appl. No. 11/140,092, mailed Sep. 29, 2008; 14 pages.
Office Action received for U.S. Appl. No. 11/027,719 mailed on Dec. 10, 2008, pp. 18.
Office Action received for U.S. Appl. No. 10/815,895 mailed on Jan. 7, 2009, pp. 25.
Office Action received for Chinese Patent Application No. 200480042550.4, Mailed on Aug. 14, 2009, 4 pages of Office Action and English translation of 7 pages.
Notice of Allowance received for U.S. Appl. No. 10/815,895, Mailed on Nov. 5, 2009, pp. 14.
Office Action received for Japanese Patent Application No. 2007-502782, Mailed on Aug. 4, 2009, 3 pages of Office Action and English translation of 2 pages.
Non-Final Office Action received for U.S. Appl. No. 11/027,719, Mailed on Nov. 9, 2009, pp. 18.
Notice of Allowance received for Japanese Patent Application No. 2007502782, mailed on Jan. 12, 2010.
Final Office Action received for U.S. Appl. No. 11/140,092, mailed on Jan. 5, 2010, 17 Pages.
Notice of Allowance received for U.S. Appl. No. 10/815,895, mailed on Feb. 23, 2010, 4 Pages.
Final Office Action received for U.S. Appl. No. 11/027,719, mailed on Apr. 5, 2010, 15 Pages.
Non-Final Office Action received for U.S. Appl. No. 11/140,092, mailed on May 13, 2010, 16 Pages.

* cited by examiner

USING A THRESHOLD VALUE TO CONTROL MID-INTERRUPT POLLING

PRIORITY INFORMATION

This application is a continuation-in-part of U.S. patent application Ser. No. 10/815,895 entitled "Accelerated TCP (Transport Control Protocol) Stack Processing", filed Mar. 31, 2004, and claims the benefit of priority thereof.

FIELD

Embodiments of this invention relate to using a threshold value to control mid-interrupt polling.

BACKGROUND

Networking has become an integral part of computer systems. Advances in network bandwidths, however, have not been fully utilized due to overhead that may be associated with processing protocol stacks. Overhead may result from bottlenecks in the computer system from using the core processing module of a host processor to perform slow memory access functions such as data movement, as well as host processor stalls related to data accesses missing the host processor caches. A protocol stack refers to a set of procedures and programs that may be executed to handle packets sent over a network, where the packets may conform to a specified protocol. For example, TCP/IP (Transport Control Protocol/Internet Protocol) packets may be processed using a TCP/IP stack.

U.S. patent application Ser. No. 10/815,895 describes an accelerated protocol for processing TCP/IP packets. One of the components of this accelerated protocol is the ability to optimize the TCP flow by offloading the data copy from the host to a data movement module (hereinafter "DMM"), such as a DMA (direct memory access) engine. This data copy offload is furthermore overlapped with the protocol processing. However, as protocol processing is further optimized using faster processors, the data copy time may fall behind. As a consequence, the processor stays within the current interrupt utilizing valuable processing power. Furthermore, since the DMM is not polled for data copy completions until the driver completes protocol processing for the current interrupt, and since the application requesting the data won't post new buffers or repost the used buffers until data receives are completed, a significant latency may result from the data copy lag time.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
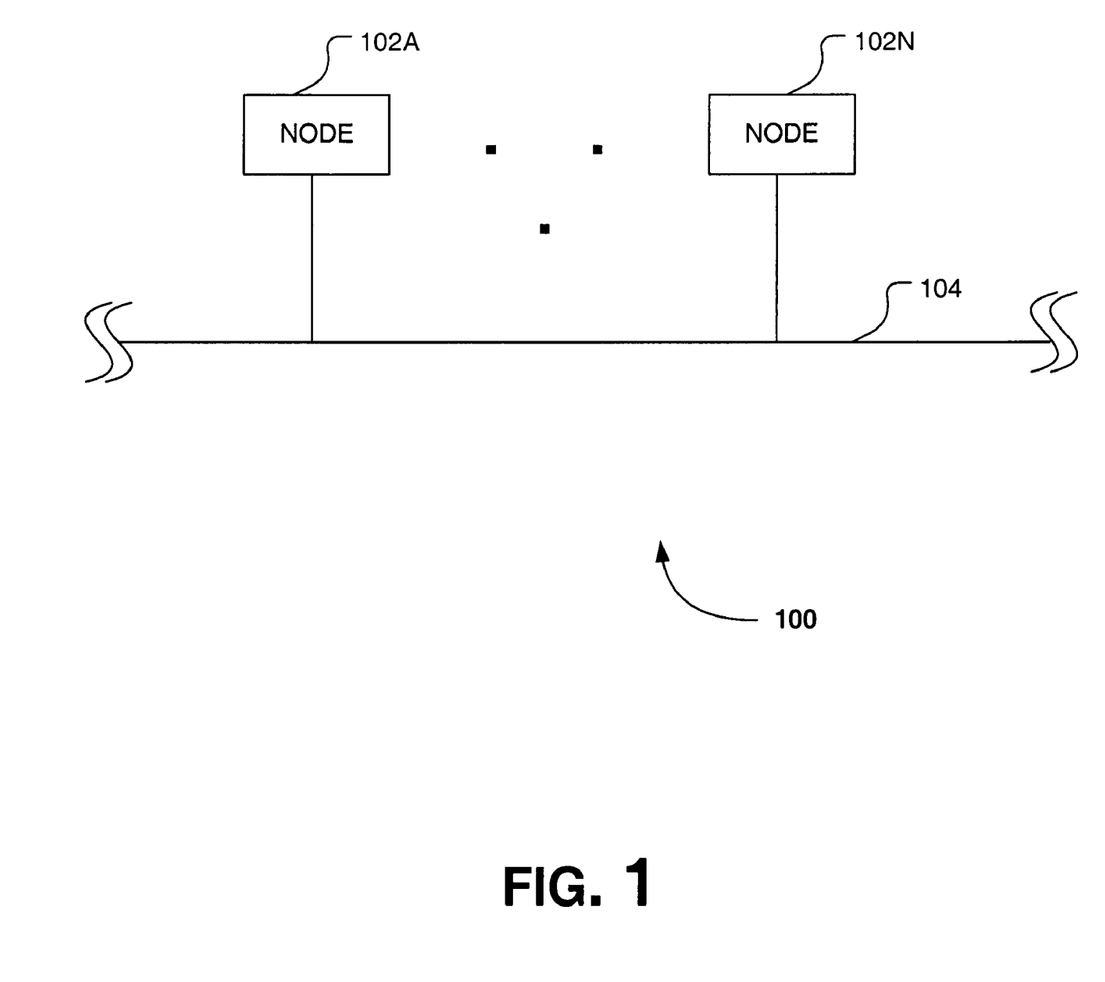
FIG. 1 illustrates a network according to one embodiment.

FIG. 1 illustrates a network 100 in which embodiments of the invention may operate. Network 100 may comprise a plurality of nodes 102A, . . . 102N, where each of nodes 102A, . . . 102N may be communicatively coupled together via a communication medium 104. As used herein, components that are "communicatively coupled" means that the components may be capable of communicating with each other via wirelined (e.g., copper wires), or wireless (e.g., radio frequency) means. Nodes 102A . . . 102N may transmit and receive sets of one or more signals via medium 104 that may encode one or more packets.

As used herein, a "packet" means a sequence of one or more symbols and/or values that may be encoded by one or more signals transmitted from at least one sender to at least one receiver. As used herein, a "communication medium" means a physical entity through which electromagnetic radiation may be transmitted and/or received. Communication medium 104 may comprise, for example, one or more optical and/or electrical cables, although many alternatives are possible. For example, communication medium 104 may comprise air and/or vacuum, through which nodes 102A . . . 102N may wirelessly transmit and/or receive sets of one or more signals.

In network 100, one or more of the nodes 102A . . . 102N may comprise one or more intermediate stations, such as, for example, one or more hubs, switches, and/or routers; additionally or alternatively, one or more of the nodes 102A . . . 102N may comprise one or more end stations. Also additionally or alternatively, network 100 may comprise one or more not shown intermediate stations, and medium 104 may communicatively couple together at least some of the nodes 102A . . . 102N and one or more of these intermediate stations. Of course, many alternatives are possible.

Figure 2:
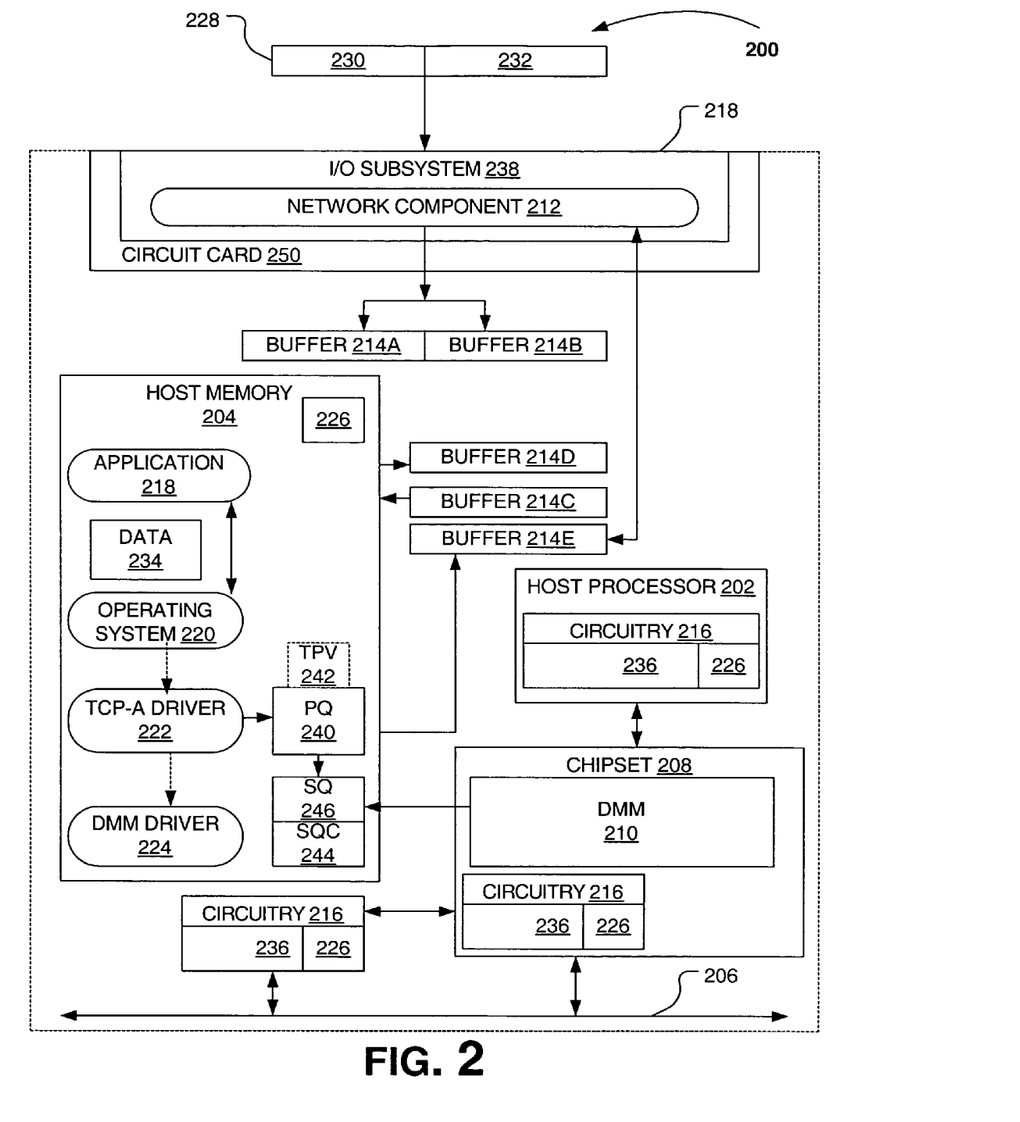
FIG. 2 illustrates a system according to one embodiment.

At least one of nodes 102A, . . . , 102N may comprise system 200, as illustrated in FIG. 2. System 200 may comprise host processor 202, host memory 204, bus 206, and chipset 208. (System 200 may comprise more than one host processor 202, host memory 204, bus 206, and chipset 208, or other types of processors, memories, busses, and chipsets; however, the former are illustrated for simplicity of discussion, and are not intended to limit embodiments of the invention.) Host processor 202, host memory 204, bus 206, and chipset 208 may be comprised in a single circuit board, such as, for example, a system motherboard 218.

Host processor 202 may comprise a core processing module and other support modules that interface with other system elements. For example, a support module may include a bus unit that communicates with a memory controller on system 200. Host processor 202 may comprise, for example, an Intel® Pentium® microprocessor that is commercially available from the Assignee of the subject application. Of course, alternatively, host processor 202 may comprise another type of microprocessor, such as, for example, a microprocessor that is manufactured and/or commercially available from a source other than the Assignee of the subject application, without departing from embodiments of the invention.

Host processor 202 may be communicatively coupled to chipset 208. Chipset 208 may comprise a host bridge/hub system that may couple host processor 202 and host memory 204 to each other and to bus 206. Chipset 208 may also include an I/O bridge/hub system (not shown) that may couple the host bridge/bus system to bus 206. Chipset 208 may comprise one or more integrated circuit chips, such as those selected from integrated circuit chipsets commercially available from the Assignee of the subject application (e.g., graphics memory and I/O controller hub chipsets), although other one or more integrated circuit chips may also, or alternatively, be used.

Bus 206 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 106 instead may comprise a bus that complies with the PCI-X Specification Rev. 1.0a, Jul. 24, 2000, (hereinafter referred to as a "PCI-X bus"), or a bus that complies with the PCI-E Specification Rev. PCI-E (hereinafter referred to as a "PCI-E bus"), as specified in "The PCI Express Base Specification of the PCI Special Interest Group", Revision 1.0a, both available from the aforesaid PCI Special Interest Group, Portland, Oreg., U.S.A. Also, alternatively, bus 106 may comprise other types and configurations of bus systems.

System 200 may additionally comprise circuitry 216. Circuitry 216 may comprise one or more circuits to perform one or more operations described herein as being performed by a driver, such as TCP-A (Transport Control Protocol-Accelerated) driver 222, and/or a network component, such as network component 212. Circuitry 216 may be hardwired to perform the one or more operations, and/or may execute machine-executable instructions to perform these operations. For example, circuitry 216 may comprise memory 236 that may store machine-executable instructions 226 that may be executed by circuitry 216 to perform these operations. Instead of being comprised in host processor 202, or chipset 208, some or all of circuitry 216 may be comprised in a circuit card 250, and/or other structures, systems, and/or devices that may be, for example, comprised in motherboard 218, and/or communicatively coupled to bus 206, and may exchange data and/or commands with one or more other components in system 200. Circuitry 216 may comprise, for example, one or more digital circuits, one or more analog circuits, one or more state machines, programmable circuitry, and/or one or more ASIC's (Application-Specific Integrated Circuits).

System 200 may additionally comprise one or more memories to store machine-executable instructions 226 capable of being executed, and/or data capable of being accessed, operated upon, and/or manipulated by circuitry, such as circuitry 216. For example, these one or more memories may include host memory 204, or memory 236. One or more memories 204, 236 may, for example, comprise read only, mass storage, random access computer-readable memory, and/or one or more other types of machine-readable memory. The execution of program instructions 226 and/or the accessing, operation upon, and/or manipulation of data by circuitry 216 may result in, for example, circuitry 216 carrying out some or all of the operations described herein as being carried out by various hardware and/or software components in system 200.

For example, machine-executable instructions 226 may comprise a set of instructions for an application 218; a set of instructions for operating system 220; a set of instructions for TCP-A driver 222; and/or a set of instructions for DMA (direct memory access) driver 224. In one embodiment, circuitry 216 of host processor 202 may execute machine-executable instructions 226 for TCP-A driver 222, for DMM driver 224, and for operating system 220. Machine-executable instructions 226 may execute in memory by circuitry 216, such as in host processor 202, and/or by circuitry 216 in general.

System 200 may additionally comprise I/O (input/output) subsystem 238 having a network component 212. "Network component" refers to any combination of hardware and/or software on an I/O (input/output) subsystem that may process one or more packets sent and/or received over a network. In one embodiment, I/O subsystem 238 may comprise, for example, a NIC (network interface card), and network component 212 may comprise, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland. I/O subsystem 238 may be comprised, for example, in a circuit card 250. Alternatively, it may be comprised on circuit board 218 as a component.

Figure 5:
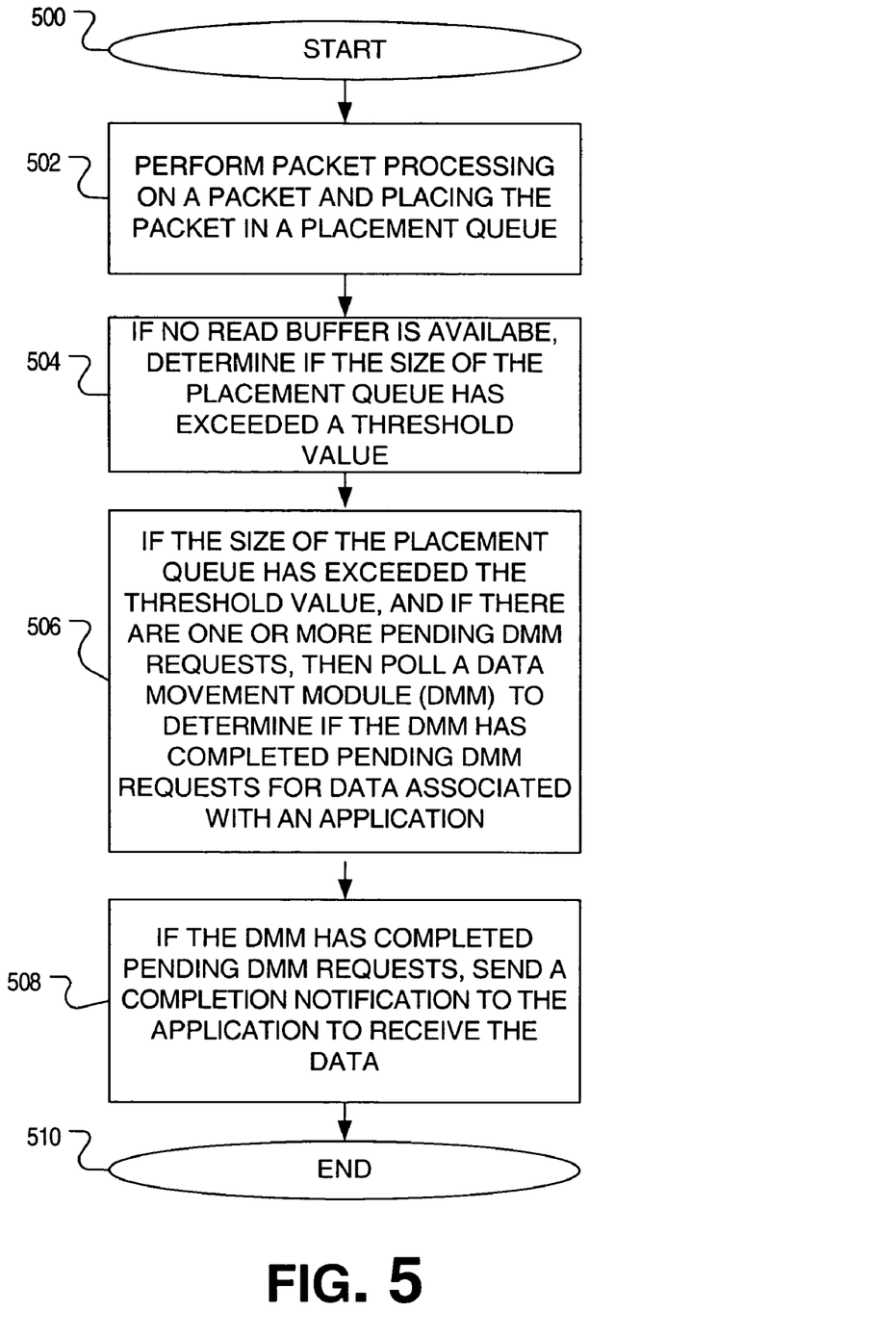
FIG. 5 is a flowchart illustrating a receive method according to another embodiment.

A method according to one embodiment is illustrated in the flowchart of FIG. 5 with reference to system 200 of FIG. 2. The method begins at block 500 and continues to block 502 where TCP-A driver 222 may perform packet processing on a packet and place the packet in a placement queue. Each packet 228 may comprise a header 230 and a payload 232. For each packet 228, network component 212 may split header 230 and payload 232 from packet 228, and post each 230, 232 to one or more post buffers 214A, 214B. In one embodiment, header 230 may be posted to a first buffer such as post buffer 214A, and payload 232 may be posted to a second buffer such as post buffer 214B. The one or more packets 228 may be received in response to a read data request from, for example, application 218.

In one embodiment placement queue may be PQ (placement queue) 240. PQ 240 may store packets 228 that are ready for placement in read buffer 214C. PQ 240 may store packets 228 by storing pointers to the packets 228 such that the packets 228. Packets 228 ready for placement in read buffer 214C may be packets that are waiting to be scheduled for placement by DMM 210, or that are waiting to be indicated to application 218. The method may continue to block 504.

At block 504, if no read buffer 214C is available, TCP-A 222 driver may determine if the size of the placement queue exceeds a threshold value. In one embodiment, this may be determined by determining if PQ 240 is larger than threshold polling value (TPV) 242. TPV 242 may comprise a value that represents the maximum number of packets 228 that TCP-A driver 222 may process while those packets await indication to application 218 for application to complete receive of payload 232 associated with those packets 228. TPV 242 may be applied on a per connection context basis, or on a global basis. Furthermore, the TPV 242 may be predetermined, and/or may be adaptive. For example, the TPV 242 may track the history of application buffer sizes per context, and set the TPV 242 accordingly.

At block 506, if the size of the placement queue exceeds a threshold value, and if there are one or more pending DMM requests, then TCP-A driver 222 may poll DMM 210 to determine if the DMM has completed pending DMM requests for data associated with an application 218.

As used herein, a "DMM" refers to a module for moving data from a source to a destination without using the core processing module of a host processor, such as host processor 202. In one embodiment, DMM 210 may comprise a DMA engine. By using the DMM 210 for placement of data, host processor 202 may be freed from the overhead of performing data movements, which may otherwise result in the host processor 202 running at much slower memory speeds compared to the core processing module speeds.

"Application" refers to one or more programs that use the network. An application 218 may comprise, for example, a web browser, an email serving application, a file serving application, or a database application. In conjunction with a read data request, application 218 may designate destination read buffer 214C where application 218 may access the requested data. In conjunction with a transmit data request, application 218 may write data to be transmitted to source buffer 214D.

At block 508, if the DMM has completed pending DMM requests, then TCP-A driver 222 may send a completion notification to the application to receive the data. As used herein, a "completion notification" refers to a notification that data is available from a read buffer, and "completing a receive" refers to data being read from the read buffer. Once application 218 has completed a receive, application 218 may post more buffers, and/or repost the buffers. For example, application 218 may read data from read buffer 214C so that it can repost read buffer 214C for further data. Furthermore, the packet on PQ 240 corresponding to the DMM completion may be removed from PQ 240, which may result in reducing the size of PQ 240.

The method ends at block 510.

Figure 3:
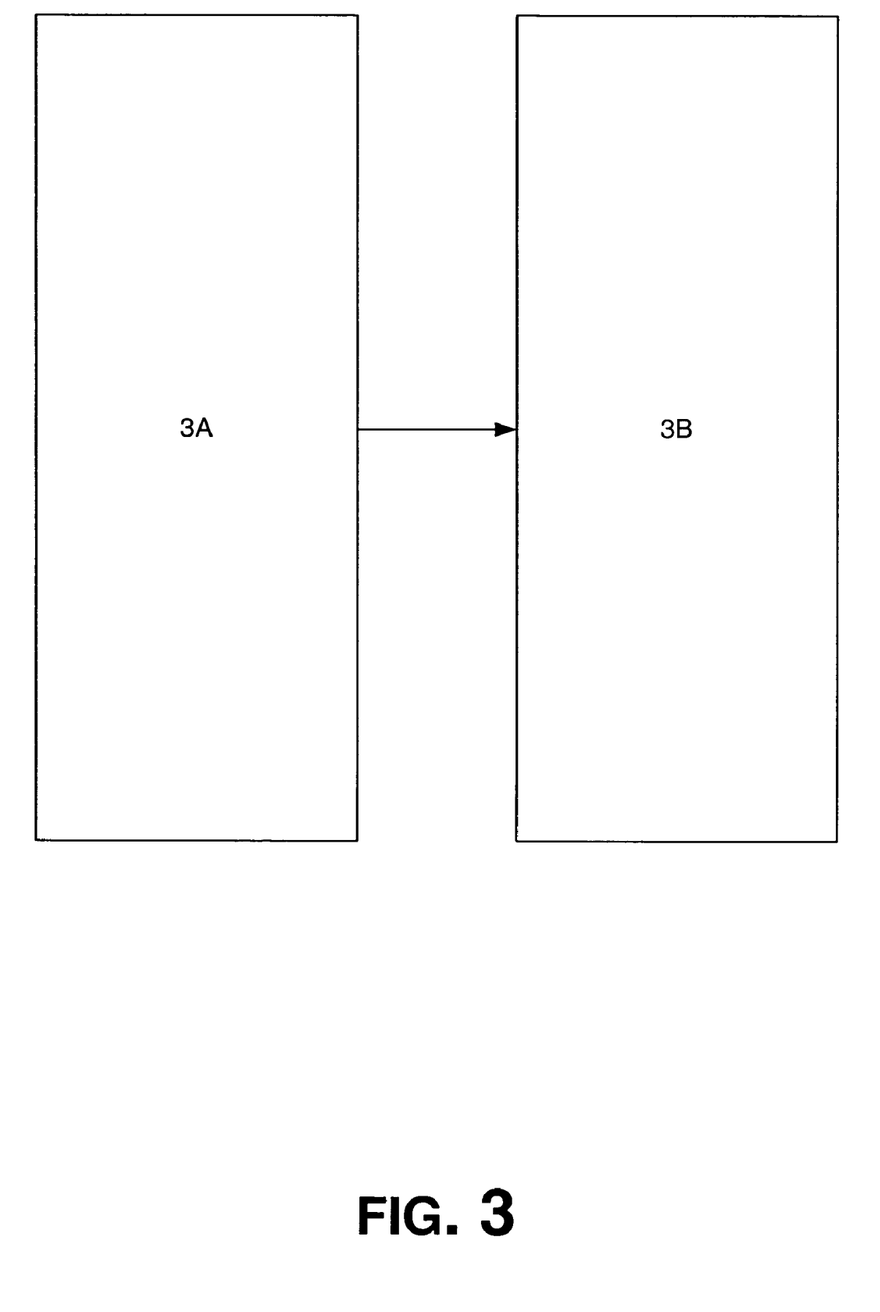
FIG. 3 is a block diagram illustrating the relationship between FIGS. 3A and 3B.
Figure 3A:
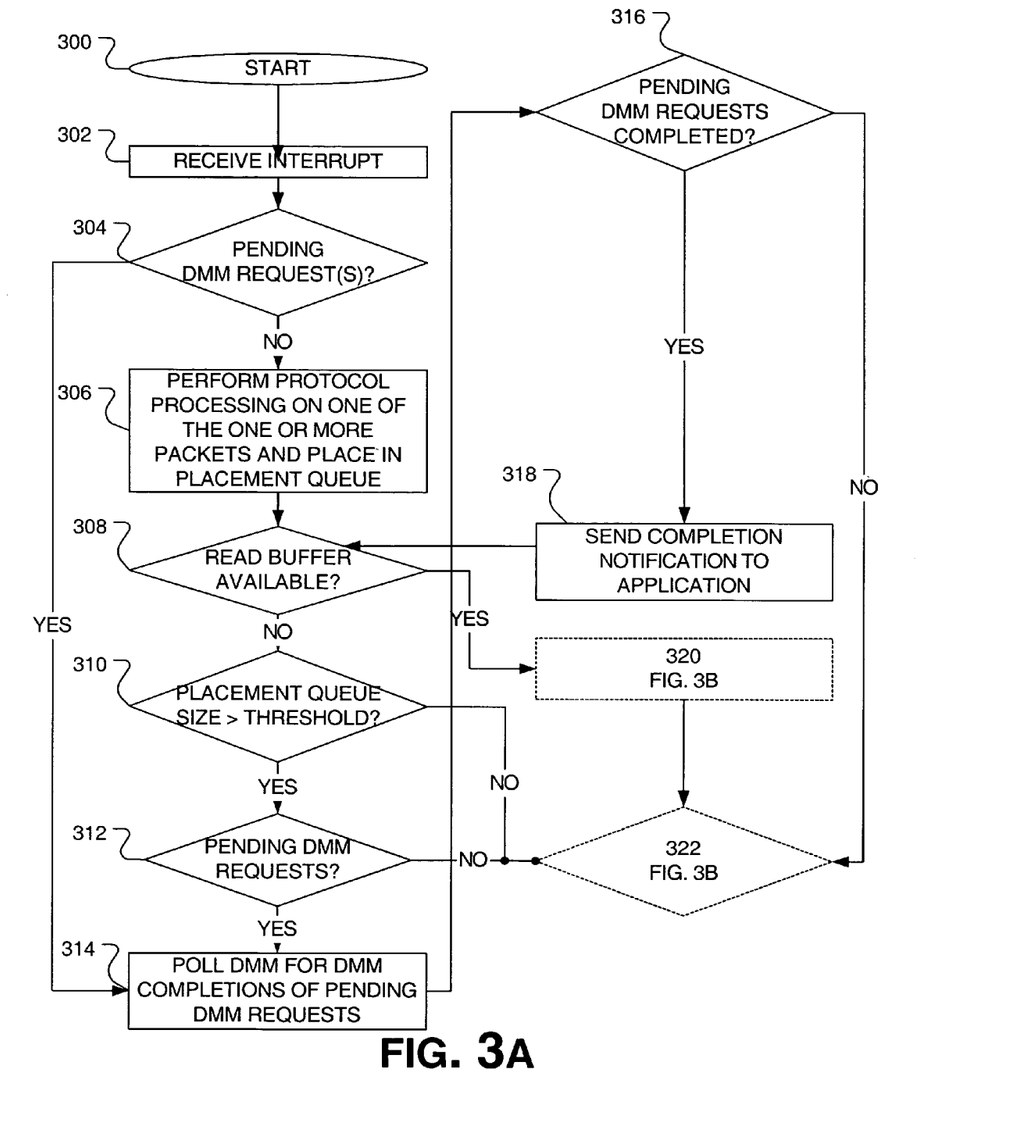
FIG. 3A is a flowchart illustrating a receive method according to one embodiment.
Figure 3B:
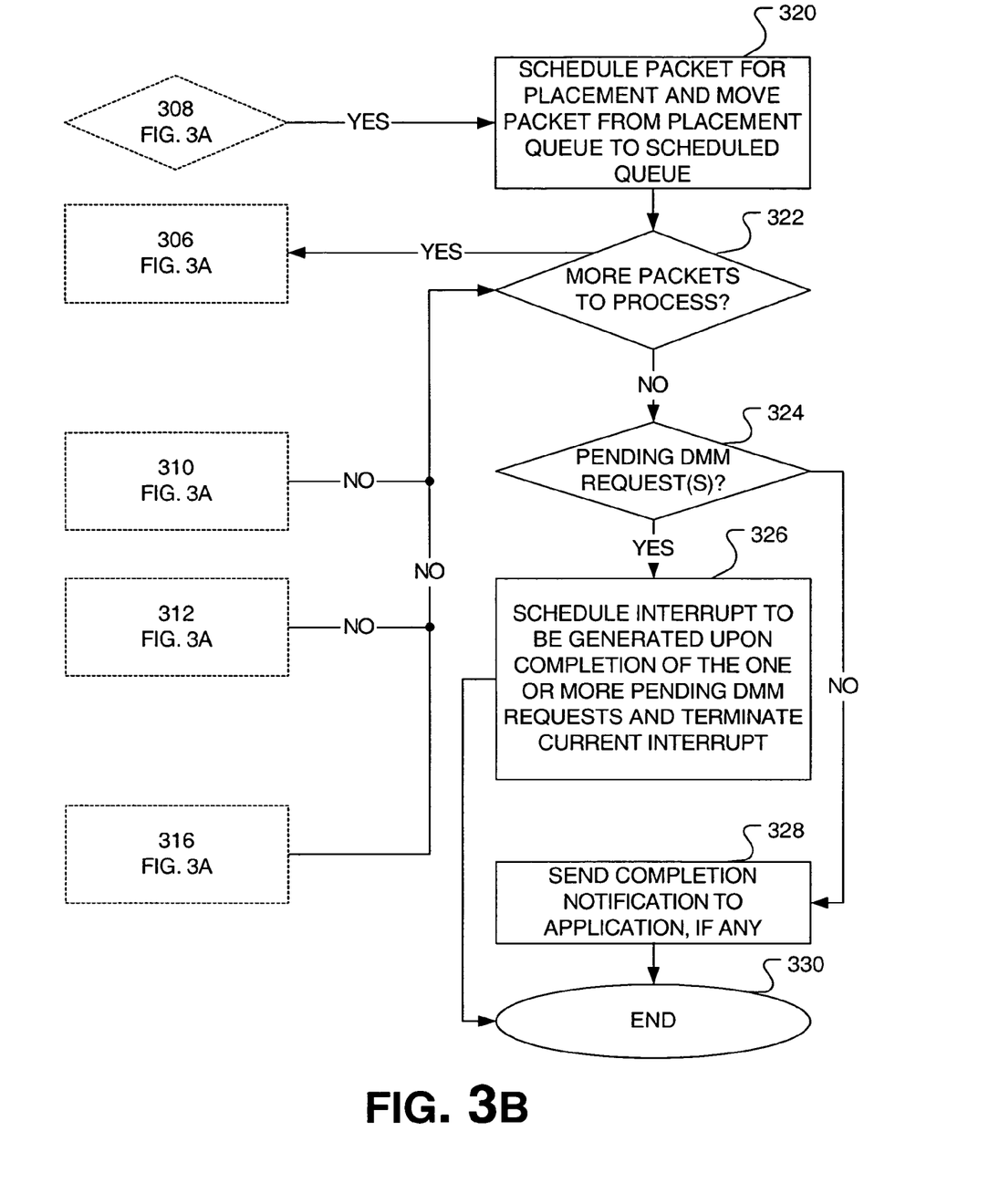
FIG. 3B is a flowchart illustrating a receive method according to one embodiment.

A method according to another embodiment is illustrated in the flowcharts of FIG. 3A and FIG. 3B, with reference to system 200 of FIG. 2, and where the relationship between these flowcharts is illustrated in FIG. 3. In reference to FIG. 3A, the method begins at block 300, and continues to block 302 where an interrupt may be received. The interrupt may be a NIC interrupt where network component 212 may notify TCP-A driver 222 that one or more packets 228 are available for processing. This may be done, for example, in response to network component 212 receiving an indication that one or more packets 228 (only one shown) have been received from network 100.

In certain embodiments, TCP-A driver 222 may be notified by network component 212 notifying operating system 220 of the availability of one or more packets 228 in accordance with an interrupt moderation scheme. An interrupt moderation scheme refers to a condition where an interrupt may be asserted for every n packets received by network component 212. Thus, if network component 212 receives n or more packets, network component 212 may notify operating system 220 that one or more packets 228 have arrived. Likewise, if network component 212 receives less than n packets, network component 212 may instead wait until more packets 228 are received before notifying operating system 220. Operating system 220 may notify TCP-A driver 222 that packets 228 are ready to be processed.

Alternatively, in one embodiment, the interrupt may be a DMM interrupt. This interrupt refers to an interrupt that may indicate the completion of one or more pending DMM requests. A "pending DMM request" refers to a pending write of payload associated with a packet from a post buffer to a read buffer, where the payload has already been indicated to DMM for placement. Upon receipt of an interrupt, pending DMM requests may be from a previous interrupt, such as the interrupt immediately preceding the current interrupt. In one embodiment, pending DMM requests may be stored in SQ 246. SQ 246 may store pending DMM requests by storing pointers to the packets corresponding to the pending DMM requests. For example, if there are one or more packets 228 for which the associated payload 232 is to be copied from post buffer 214B to read buffer 214C, and the payload 232 has already been scheduled for DMM placement, then the pending DMM requests may be found in SQ 246. In one embodiment, if size of SQ 246 is greater than 0, then there are pending DMM requests. The method may continue to block 304.

At block 304, TCP-A driver 222 may determine if there are pending DMM requests. In one embodiment, this may be determined by checking SQ 246. In one embodiment, pending DMM requests for a particular context may be checked. Pending DMM requests for a particular context may be stored in SQC (scheduled queue-context) 244 such that if size of SQC 244 for the given context is >0, then there are pending DMM requests for the given context. SQC 244 may store pending DMM requests for a given context by storing pointers to the packets corresponding to the pending DMM requests for the given context. A "previous context" refers to a protocol context prior to the current interrupt received at block 302. As used herein, "protocol context", hereinafter referred to as a "connection context" refers to information about a connection. For example, the information may comprise the sequence number of the last packet sent/received, and amount of memory available. A "connection" as used herein refers to a logical pathway to facilitate communications between a first node on a network and a second node on the network.

Since TCP-A driver 222 may not know whether the received interrupt is from a NIC, for example, or a DMM, it may determine if there are pending DMM requests. If at block 304, there are pending DMM requests, then TCP-A driver 222 knows to poll DMM 210 for DMM completions, and the method may continue to block 314. If, at block 304, there are no pending DMM requests from the previous context, the method may continue to block 306.

At block 306, TCP-A driver 222 may perform protocol processing on one of the one or more packets 228, and place the packet 228 in a placement queue. As mentioned above, placement queue may comprise PQ 240. Packet processing may be performed by TCP-A driver 222 retrieving header 230 from post buffer 214A, parsing the header 230 to determine the connection context associated with the packet, and performing TCP protocol compliance. TCP protocol compliance may comprise, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol (e.g., TCP/IP); and ensuring that the timestamps are within an expected time range.

As part of packet processing, TCP-A driver 222 may determine if packet 228 is ready for placement. A payload 232 may be ready for placement if, for example, the corresponding header has been successfully processed, and/or one or more read buffers, such as read buffer 214C, have been designated. Where payload 232 cannot be placed because one or more read buffers 214C do not exist, for example, TCP-A driver 222 may indicate to operating system 220 the presence of payload 232 ready to be placed. Operating system 220 may then designate a buffer, or may ask application 218 to designate a buffer. Also, if payload 232 cannot be placed because one or more read buffers 214C are full, TCP-A driver 222 may wait until application 218 posts more buffers or reposts buffers.

TCP-A driver 222 may fetch a next header to process prior to completing the processing of a current header. This may ensure that the next header is available in the host processor's caches (not shown) before the TCP-A driver 222 is ready to perform TCP processing on it, thereby reducing host processor stalls. In one embodiment, TCP-A driver 222 may additionally determine if a connection associated with a packet is to be accelerated prior to performing packet processing. TCP-A driver 222 may accelerate select connections. Select connections may comprise, for example, connections that are long-lived, or which comprise large data. If TCP-A driver 222 determines that network connection is to be accelerated, TCP-A driver 222 may perform packet processing as described at block 306. If TCP-A driver 222 determines that network connection is not to be accelerated, TCP-A driver 222 may relinquish packet processing control to TCP driver (not shown) to perform non-accelerated packet processing. The method may continue to block 308.

At block 308, TCP-A driver 222 may determine if read buffer 214C is available. If application 218 has previously posted read buffer 214C, and TCP-A driver 222 knows that read buffer 214C is not full, then TCP-A driver 22 may determine read buffer 214C to be available. On the other hand, if TCP-A driver 222 knows that read buffer 214C has been filled to capacity, then TCP-A driver 22 may determine read buffer 214C is not available. For example, if TCP-A driver 222 receives 2K of data, and indicates this to the application 218, application 218 may return a 4K read buffer 214C, of which 2K may be filled with 2K of data by TCP-A driver 222. If TCP-A driver 222 next receives 2K of data, TCP-A driver 222 knows that it has 2K of read buffer 214C available in which to place the data. If TCP-A driver 222 next receives another 2K of data, then TCP-A driver 222 knows that read buffer 214C is not available because the previously 4K read buffer 214C received from application 218 has been filled to capacity. If read buffer 214C is available, then the method may continue to block 320 (FIG. 3B). If read buffer 214C is not available, then the method may continue to block 310.

At block 310, it may be determined if the size of the placement queue exceeds a threshold value. In one embodiment, if size of PQ 240 is not larger than TPV 242, the method may continue to block 322 (FIG. 3B). Likewise, if size of PQ 240 is larger than TPV 242, the method may continue to block 312.

At block 312, TCP-A driver 222 may determine if there are pending DMM requests. Pending DMM requests at this point may comprise DMM requests stored in SQ 246 in the current interrupt. If there are pending DMM requests, then the method may continue to block 314. If there are no pending DMM requests, then the method may continue to block 322 (FIG. 3B).

At block 314, DMM 210 may be polled for DMM completions of pending DMM requests. "DMM completions" refer to the completion of pending DMM requests. Since DMM polling is based on TPV 242, the rate of DMM polling may be controlled. In one embodiment, a completed pending DMM request means that DMM 210 has moved data associated with the pending DMM request from buffer 214B to buffer 214C. The method may continue to block 316.

At block 316, if pending DMM requests have been completed, then the method may continue to block 318. If at block 314, pending DMM requests have not been processed, then the method may continue to block 322 (FIG. 3B).

At block 318, TCP-A driver 222 may send completion notification to application 218. The method may continue to block 308.

In reference to FIG. 3B, at block 320, TCP-A driver 222 may schedule the packet for placement and move the packet from the placement queue to a scheduled queue. In one embodiment, this may comprise TCP-A driver 222 sending a request to DMM driver 224, and DMM driver 224 scheduling a request with DMM 210 to write the one or more payloads 232 from post buffer 214B to read buffer 214C. DMM driver 224 may be a standalone driver, or part of some other driver, such as TCP-A driver 222. Rather than being part of chipset 208, DMM 210 may be a support module of host processor 202.

In this embodiment, scheduled requests may be placed in SQ 246, and SQ 246 may be incremented. Furthermore, SQC 244 for the current context may also be incremented to indicate that there are pending DMM requests for the current context. DMM 210 may complete pending DMM requests by moving data from post buffer 214B to read buffer 214C as queued in SQ 246. The method may continue to block 322.

It is also possible that payload 232 may be placed by TCP-A driver 222 requesting DMM 210 to write the one or more payloads 232 from post buffer 214B to read buffer 214C. Alternatively, TCP-A driver 222 may write the one or more payloads 232 from post buffer 214B to read buffer 214C using host processor 202, for example. In such cases, the packet is not scheduled, and SQ 246 is not incremented.

At block 322, it may be determined if there are more incoming packets 228. If there are more incoming packets at block 320, the method may revert back to block 306 to continue packet processing of received packets 228. If there are no more incoming packets 228, the method may continue to block 324.

At block 324, TCP-A driver 222 may determine if there are more pending DMM requests. This may be determined by checking SQ 246. If at block 322 there are one or more pending DMM requests, the method may continue to block 326. If at block 322 there are no more pending DMM requests, then the method may continue to block 328.

At block 326, TCP-A driver 222 may schedule an interrupt to be generated upon completion of the one or more pending DMM requests, and terminate the current interrupt. The interrupt may be a DMM interrupt generated by DMM 210 or a NIC interrupt generated by I/O subsystem 238, for example. The method may continue to block 330.

In another embodiment, TCP-A driver 222 may pass control back to operating system 220 after terminating the current interrupt. If one or more packets 228 have still not been processed, operating system 220 may notify a TCP driver (not shown) rather than TCP-A driver 222, where the TCP driver may perform TCP stack processing by performing packet processing, and by using the core processing module of host processor 202 to perform data transfers. Furthermore, if there are no pending DMM request, TCP-A driver 222 may send a completion notification to application 218, and application 218 may complete one or more receives.

In one embodiment, rather than terminate the current interrupt if there are no more incoming packets, and there are still one or more pending DMM request, TCP-A driver 222 may instead perform other tasks. Other tasks may include looking for more packets in a subsequent interrupt, setting up the DMM 210 to issue an interrupt upon completion of a last queued task for the current interrupt, or other housekeeping, such as transmitting data, and performing TCP timer related tasks.

At block 328, TCP-A driver 222 may send a completion notification to application 218. Application 218 may complete the receive and post and/or repost one or more read buffers. The method may continue to block 330.

The method may end at block 330.

Figure 4:
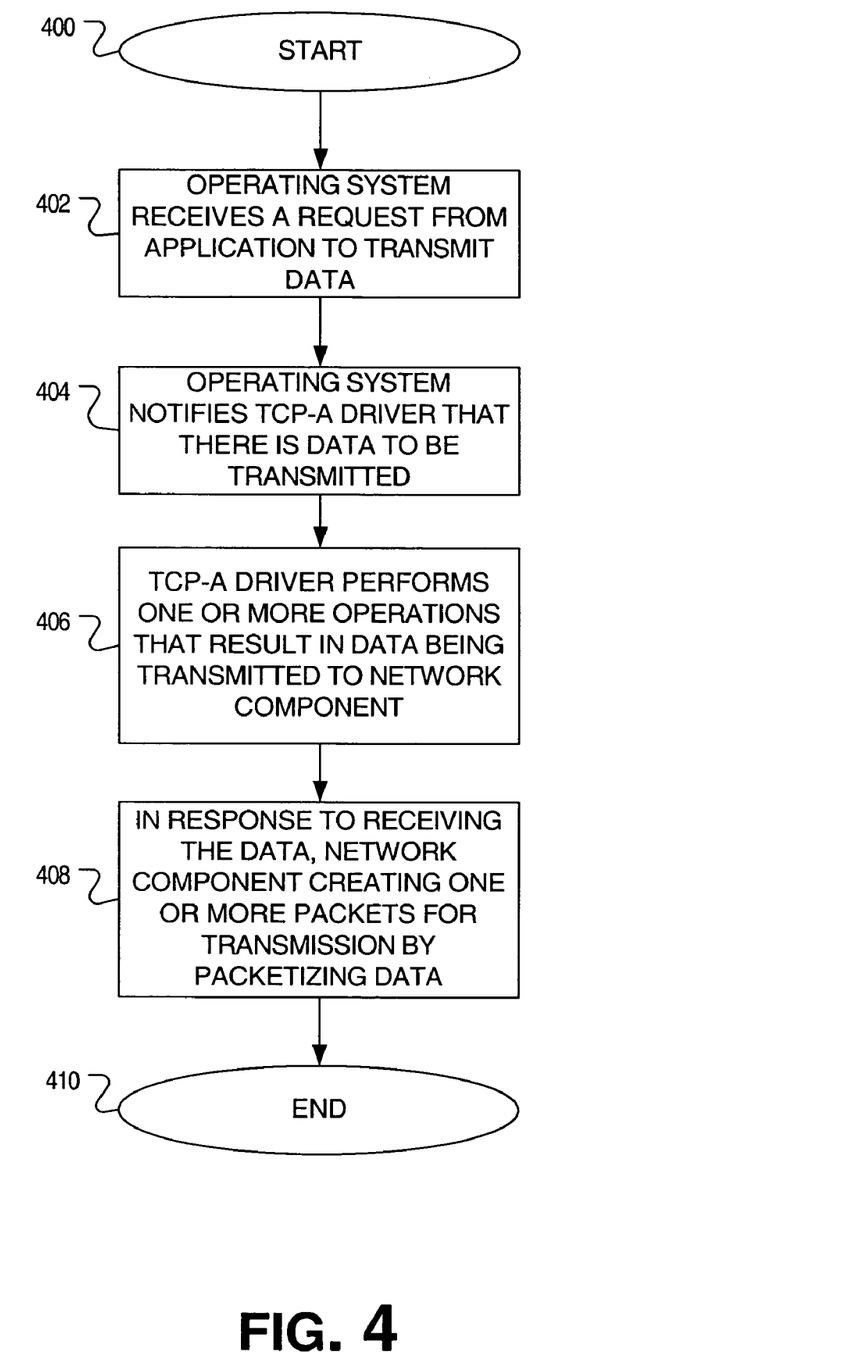
FIG. 4 is a flowchart illustrating a transmit method according to one embodiment.

A method according to another embodiment is illustrated in FIG. 4. The method begins at block 400 and continues to block 402 where operating system 220 may receive a request from application 218 to transmit data 234 placed in buffer 214D. Operating system 220 may perform preliminary checks on data 234. Preliminary checks may include, for example, obtaining the associated connection context. In a TCP/IP connection, for example, connection context may comprise packet sequence numbers to identify the order of the packets, buffer addresses of buffers used to store data, and timer/timestamp information for retransmissions.

At block 404, operating system 220 may notify TCP-A driver 222 that there is data 234 to be transmitted from buffer 214D.

At block 406, TCP-A driver 222 may perform one or more operations that result in data 234 being transmitted to network component 212. For example, these one or more operations may include TCP-A driver 222 programming DMM 210 to transmit data 234 from source buffer 214D to network component 212. Alternatively, TCP-A driver 222 may queue a buffer, such as queued buffer 214E, to network component 212, where network component 212 may instead read data 234 from queued buffer 214E. Source buffer 214D may be designated by application 218, for example, and queued buffer 214E may be designated by network component 212, for example.

In one embodiment, TCP-A driver 222 may program DMM 210 to transmit data if the data is small, and TCP-A driver 222 may queue a buffer, such as queued buffer 214E, if the data is large. As used herein, "queuing a buffer" means to notify a component that there is a buffer from which it can access data. For example, TCP acknowledgment packets to acknowledge receipt of packets may typically be relatively small-sized packets, and may be sent by TCP-A driver 222 to network component 212 by TCP-A driver 222 programming DMM 210 to transmit data 234. As another example, storage applications that send large files over the network may be relatively large, and may therefore be sent by TCP-A driver 222 to network component 212 by queuing buffer 214E.

At block 408, in response to receiving the data, network component 212 may create one or more packets for transmission by packetizing the data. In one embodiment, network component 212 may packetize data by performing segmentation on the data. "Segmentation" refers to breaking the data into smaller pieces for transmission. In one embodiment, network component 212 may comprise a MAC, and segmentation may be referred to as a large send offload, wherein MAC frames may be created for transmission of data 234 over the network. Network component 212 may receive data directly from TCP-A driver 222, or by accessing queued buffer 214E.

The method may end at block 410. Thereafter, operating system 220 may send a completion notification to application 218. Furthermore, source buffer 214D may be returned to application 218, and application may use the buffer for other purposes.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

CONCLUSION

Therefore, in one embodiment, a method may comprise performing packet processing on a packet, and placing the packet in a placement queue; if no read buffer is available, determining if the size of the placement queue exceeds a threshold polling value; and if the size of the placement queue exceeds the threshold polling value: if there are one or more pending DMM (data movement module) requests, polling a DMM to determine if the DMM has completed the one or more pending DMM requests for data associated with an application; and if the DMM has completed the one or more pending DMM requests, then sending a completion notification to the application to receive the data.

Embodiments of the invention may enable a processor to terminate a current interrupt, which may otherwise utilize valuable processing power, without having to wait for the completion of all pending DMM requests in the current interrupt. Furthermore, since DMM polling may be performed prior to the end of a current interrupt, applications may post new buffers or repost the used buffers during a current interrupt, rather than wait for pending DMM requests to complete before posting new buffers or repost the used buffers. Since DMM polling, which may be a very time-consuming process, is controlled by a threshold value, resources may be further conserved.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
   performing packet processing on a packet, and placing the packet in a placement queue;
   if no read buffer is available, then determining if the size of the placement queue exceeds a threshold polling value;
   if a read buffer is available, then scheduling the packet for placement and moving the packet from the placement queue to a scheduled queue;
   if the size of the placement queue exceeds the threshold polling value:
      then if there are one or more pending DMM (data movement module) requests for data associated with an application, polling a DMM to determine if the DMM has completed the one or more pending DMM requests; and then if the DMM has completed the one or more pending DMM requests, then sending a completion notification to the application to receive the data; and if the size of the placement queue does not exceed the threshold polling value, then if there are one or more packets to process, performing protocol processing on the one or more packets and placing the one or more packets in a placement queue.

2. The method of claim 1, wherein the method takes place in a current interrupt, and if there are no more packets to process:

determining if there are one or more pending DMM requests; and if there are one or more pending DMM requests, then scheduling an interrupt to be generated upon completion of the one or more pending DMM requests and terminating the current interrupt.

3. The method of claim 2, additionally comprising if there are no more pending DMM requests, then sending a completion notification to the application.

4. The method of claim 1, additionally comprising:

prior to performing packet processing on the packet, receiving an interrupt; and if there are pending DMM requests from a previous context, then:

polling the DMM for DMM completions of pending DMM requests from the previous context; and if the pending DMM requests from the previous context have been completed, then sending a completion notification to the application.

5. The method of claim 4, wherein if there are no pending DMM requests from the previous context, then performing protocol processing on one of the one or more packets and placing the packet in a placement queue.

6. The method of claim 5, additionally comprising if a read buffer to receive data associated with the one or more packets is not available, then determining if a size of the placement queue exceeds a threshold polling value.

7. The method of claim 6, wherein if the size of the placement queue exceeds a threshold polling value, and there are pending DMM requests, then polling the DMM for DMM completions of the pending DMM requests.

8. The method of claim 6, wherein if the size of the placement queue does not exceed a threshold polling value, then if there are one or more packets to process, performing protocol processing on the one or more packets and placing the one or more packets in the placement queue.

9. An apparatus comprising:

circuitry operable to:

perform packet processing on a packet, and place the packet in a placement queue;

if no read buffer is available, then determining if the size of the placement queue exceeds a threshold polling value;

if a read buffer is available, then scheduling the packet for placement and moving the packet from the placement queue to a scheduled queue;

if the size of the placement queue exceeds the threshold polling value:

then if there are one or more pending DMM (data movement module) requests for data associated with an application, poll a DMM to determine if the DMM has completed the one or more pending DMM requests; and then if the DMM has completed the one or more pending DMM requests, then send a completion notification to the application to receive the data; and if the size of the placement queue does not exceed the threshold polling value, then if there are one or more packets to process, performing protocol processing on the one or more packets and placing the one or more packets in a placement queue.

10. The apparatus of claim 9, wherein the operations take place in a current interrupt, and if there are no more packets to process:

determine if there are one or more pending DMM requests; and if there are one or more pending DMM requests, then schedule an interrupt to be generated upon completion of the one or more pending DMM requests and terminate the current interrupt.

11. The apparatus of claim 9, additionally comprising:

prior to performing packet processing on the packet, receive an interrupt; and if there are pending DMM requests from a previous context, then:

poll the DMM for DMM completions of pending DMM requests from the previous context; and if the pending DMM requests from the previous context have been completed, then send a completion notification to the application.

12. The apparatus of claim 11, wherein if there are no pending DMM requests from the previous context, then perform protocol processing on one of the one or more packets and place the packet in a placement queue.

13. A system comprising:

a circuit board; and a circuit card coupled to the circuit board, the circuit card operable to:

perform packet processing on a packet, and place the packet in a placement queue;

if no read buffer is available, then determining if the size of the placement queue exceeds a threshold polling value;

if a read buffer is available, then scheduling the packet for placement and moving the packet from the placement queue to a scheduled queue;

if the size of the placement queue exceeds the threshold polling value:

then if there are one or more pending DMM (data movement module) requests for data associated with an application, poll a DMM to determine if the DMM has completed the one or more pending DMM requests; and then if the DMM has completed the one or more pending DMM requests, then send a completion notification to the application to receive the data; and if the size of the placement queue does not exceed the threshold polling value, then if there are one or more packets to process, performing protocol processing on the one or more packets and placing the one or more packets in a placement queue.

14. The system of claim 13, wherein the operations take place in a current interrupt, and if there are no more packets to process:

determine if there are one or more pending DMM requests; and if there are one or more pending DMM requests, then schedule an interrupt to be generated upon completion of the one or more pending DMM requests and terminate the current interrupt.

15. The system of claim 13, additionally comprising:

prior to performing packet processing on the packet, receive an interrupt; and if there are pending DMM requests from a previous context, then:
  poll the DMM for DMM completions of pending DMM requests from the previous context; and
  if the pending DMM requests from the previous context have been completed, then send a completion notification to the application.

16. The system of claim 15, wherein if there are no pending DMM requests from the previous context, then perform protocol processing on one of the one or more packets and place the packet in a placement queue.

17. The system of claim 16, additionally comprising if a read buffer to receive data associated with the one or more packets is not available, then determine if a size of the placement queue exceeds a threshold polling value.

18. An article comprising a machine-readable medium having stored thereon instructions, the instructions when executed by a machine, result in the following:
  performing packet processing on a packet, and placing the packet in a placement queue;
  if no read buffer is available, then determining if the size of the placement queue exceeds a threshold polling value;
  if a read buffer is available, then scheduling the packet for placement and moving the packet from the placement queue to a scheduled queue;
  if the size of the placement queue exceeds the threshold polling value:
    then if there are one or more pending DMM (data movement module) requests for data associated with an application, polling a DMM to determine if the DMM has completed the one or more pending DMM requests; and
  then if the DMM has completed the one or more pending DMM requests, then sending a completion notification to the application to receive the data; and
  if the size of the placement queue does not exceed the threshold polling value, then if there are one or more packets to process, performing protocol processing on the one or more packets and placing the one or more packets in a placement queue.

19. The article of claim 18, wherein the instructions take place in a current interrupt, and if there are no more packets to process, the instructions when executed by a machine, additionally result in:
  determining if there are one or more pending DMM requests; and
  if there are one or more pending DMM requests, then scheduling an interrupt to be generated upon completion of the one or more pending DMM requests and terminating the current interrupt.

20. The article of claim 18, the instructions when executed by a machine, additionally result in:
  prior to performing packet processing on the packet, receiving an interrupt; and
  if there are pending DMM requests from a previous context, then:
    polling the DMM for DMM completions of pending DMM requests from the previous context; and
    if the pending DMM requests from the previous context have been completed, then sending a completion notification to the application.

21. The article of claim 20, wherein if there are no pending DMM requests from the previous context, then the instructions when executed by a machine, additionally result in performing protocol processing on one of the one or more packets and placing the packet in a placement queue.

22. The article of claim 21, if a read buffer to receive data associated with the one or more packets is not available, then the instructions when executed by a machine, additionally result in determining if a size of the placement queue exceeds a threshold polling value.

* * * * *